US012798339B2

(12) United States Patent
Yan et al.

(10) Patent No.: US 12,798,339 B2
(45) Date of Patent: Nov. 17, 2026

(54) PATTERNED GLASS AND VEHICLE

(71) Applicant: FUYAO GLASS INDUSTRY GROUP CO., LTD., Fuqing (CN)

(72) Inventors: Zheng Yan, Fuqing (CN); Jinliang Guan, Fuqing (CN); Jiansen Zheng, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 152 days.

(21) Appl. No.: 18/978,987

(22) Filed: Dec. 12, 2024

(65) Prior Publication Data

US 2025/0108679 A1 Apr. 3, 2025

Related U.S. Application Data

(63) Continuation of application No. PCT/CN2022/098659, filed on Jun. 14, 2022.

(51) Int. Cl.
*B60J 3/00* (2006.01)
*B60J 3/04* (2006.01)
*G02F 1/01* (2006.01)

(52) U.S. Cl.
CPC .............. *B60J 3/04* (2013.01); *G02F 1/0102* (2013.01)

(58) Field of Classification Search
CPC .................................. B60J 3/04; G02F 1/0102
USPC ........................................................ 296/97.2
See application file for complete search history.

(56) References Cited

U.S. PATENT DOCUMENTS

2021/0379968 A1 12/2021 Do Rosario et al.
2024/0092152 A1* 3/2024 Gima ................ B32B 17/10293

FOREIGN PATENT DOCUMENTS

CN 204166500 U 2/2015
CN 104995544 A * 10/2015 ........... G02B 26/023
CN 111386194 A 7/2020
CN 111542430 A 8/2020
CN 116679471 A * 9/2023 ........... G02F 1/0102
JP 2013180918 A 9/2013
JP 2017032838 A 2/2017
JP 2021184039 A 12/2021
KR 20200110704 A 9/2020

(Continued)

OTHER PUBLICATIONS

The second office action issued in corresponding JP application No. 2024-573589 dated Nov. 12, 2025.

(Continued)

*Primary Examiner* — Steven O Douglas
(74) *Attorney, Agent, or Firm* — SCULLY, SCOTT, MURPHY & PRESSER, P.C.

(57) ABSTRACT

A patterned glass and a vehicle are provided. The patterned glass includes a display region having a first edge and a second edge opposite the first edge. A direction from the first edge towards the second edge serves as a first direction. The patterned glass further includes an outer glass, an inner glass, and a light control functional layer disposed between the outer glass and the inner glass. The light control functional layer has multiple partitions distributed in the first direction at intervals, where each of the multiple partitions has a first side and a second side opposite the first side, the first side and the second side are sequentially distributed in the first direction, and a distance between the first side and the second side is greater than or equal to 20 mm.

20 Claims, 10 Drawing Sheets

(56) References Cited

FOREIGN PATENT DOCUMENTS

| | | | |
|---|---|---|---|
| WO | 2019004160 | A1 | 1/2019 |
| WO | 2019166155 | A1 | 9/2019 |
| WO | 2019244871 | A1 | 12/2019 |
| WO | 2022028931 | A1 | 2/2022 |

OTHER PUBLICATIONS

Rsymons “rsev”, “Porsche Taycan GTS Sport Turismo with Variable Light Control Roof. (Don’t say Cross Turismo!)”, dated Jan. 3, 2022, URL:https://www.youtube.com/watch?v=mAXUItF99KA&t=97s&ab_channel=RSymons“RSEV”.

Extended European search report issued in corresponding European application No. 22928080.5, dated May 23, 2025.

Notice of Reasons for Refusal issued in corresponding JP application No. 2024-573589, dated Jul. 31, 2025.

International Search Report and Written Opinion dated Jan. 17, 2023 issued in PCT/CN2022/098659.

Office action issued in corresponding KR application No. 10-2024-7028957 dated Apr. 20, 2026.

* cited by examiner

PATTERNED GLASS AND VEHICLE

CROSS-REFERENCE TO RELATED APPLICATION

This application is a continuation of International Application No. PCT/CN2022/098659, filed Jun. 14, 2022, and the entire disclosure of which is hereby incorporated by reference in its entirety.

TECHNICAL FIELD

The disclosure relates to the field of glass technology, and in particular, to a patterned glass and a vehicle

BACKGROUND

Dimmable glass can switch between transparent and opaque states through various methods such as electric control, temperature control, light control, and pressure control. Due to various limitations, almost all mass-produced dimmable glass on the market is electrically controlled dimmable glass. By controlling partitions of the dimmable glass, different patterns can be displayed. However, the current partitioned dimmable glass is prone to uneven patterned-glass dimming due to unreasonable pattern settings.

SUMMARY

Embodiments of the disclosure provide a patterned glass and a vehicle, which are capable of optimizing the display uniformity of patterns of a partitioned dimmable patterned glass and enhancing the user experience.

In a first aspect, a patterned glass is provided by the disclosure. The patterned glass includes a display region having a first edge and a second edge opposite the first edge. A direction from the first edge towards the second edge serves as a first direction. The patterned glass further includes an outer glass, an inner glass, and a light control functional layer disposed between the outer glass and the inner glass. The light control functional layer has multiple partitions distributed in the first direction at intervals. Each of the multiple partitions has a first side and a second side opposite the first side, the first side and the second side are sequentially distributed in the first direction, and a distance between the first side and the second side is greater than or equal to 20 mm.

In a possible embodiment, each of the multiple partitions has multiple corners, where a radius of curvature of each of the multiple corners is greater than or equal to 1 mm.

In a possible embodiment, the first side is a straight line or a curve.

In a possible embodiment, one of the multiple partitions located at the first edge serves as a first partition, one of the multiple partitions located at the second edge serves as a second partition, and at least one of the multiple partitions located between the first edge and the second edge serves as at least one third partition. The first partition, the at least one third partition, and the second partition are arranged at intervals in the first direction.

In a possible embodiment, the at least one third partition is implemented as multiple third partitions, where the multiple third partitions are arranged at intervals and are the same in shape.

In a possible embodiment, each of the at least one third partition has a first sub-partition, a second sub-partition, and a third sub-partition, where the first sub-partition and the second sub-partition are symmetrically arranged on both sides of the third sub-partition.

In a possible embodiment, one of the multiple partitions located at the first edge serves as a first partition, one of the multiple partitions located at the second edge serves as a second partition, and regions located between the first edge and the second edge among the multiple partitions serve as multiple third partitions and at least one fourth partition, where each adjacent two third partitions among the multiple third partitions are spaced apart from each other by one fourth partition and are symmetrically arranged on both sides of the one fourth partition.

In a possible embodiment, each of the multiple third partitions has a first sub-partition, a second sub-partition, and a third sub-partition, where the first sub-partition and the second sub-partition are symmetrically arranged on both sides of the third sub-partition.

In a possible embodiment, the display region further has a third edge and a fourth edge opposite the third edge, where the third edge and the fourth edge are located between the first edge and the second edge. The first sub-partition has a first branch, a second branch, and a third branch, where the first branch extends in the first direction, the second branch and the third branch are symmetrically arranged on both sides of the first branch, both one end of the second branch and one end of the third branch are connected to one end of the first branch, another end of the second branch extends to the third edge, and another end of the third branch extends to the fourth edge.

In a possible embodiment, the display region further has a third edge and a fourth edge opposite the third edge, where the third edge and the fourth edge are located between the first edge and the second edge. Each of the multiple third partitions has a first branch, a second branch, and a third branch, where the first branch extends in the first direction, the second branch and the third branch are symmetrically arranged on both sides of the first branch, both one end of the second branch and one end of the third branch are connected to one end of the first branch, another end of the second branch extends to the third edge, and another end of the third branch extends to the fourth edge.

In a possible embodiment, each of the multiple third partitions has a first section, a second section, and a third section arranged in sequence in a direction perpendicular to the first direction, where the second section is longer than both the first section and the third section in the first direction.

In a possible embodiment, the patterned glass further includes a first conducting layer and a second conducting layer. The first conducting layer is disposed between the light control functional layer and the inner glass, and the second conducting layer is disposed between the light control functional layer and the outer glass. Alternatively, the first conducting layer is disposed between the light control functional layer and the outer glass, and the second conducting layer is disposed between the light control functional layer and the inner glass.

In a possible embodiment, the patterned glass further includes two adhesive layers. One of the two adhesive layers is disposed between the first conducting layer and the inner glass, and another one of the two adhesive layers is disposed between the second conducting layer and the outer glass. Alternatively, one of the two adhesive layers is disposed between the second conducting layer and the inner glass, and another one of the two adhesive layers is disposed between the first conducting layer and the outer glass.

In a second aspect, a vehicle is further provided in the disclosure. The vehicle includes a vehicle body and the above-mentioned patterned glass. The patterned glass is connected to the vehicle body.

BRIEF DESCRIPTION OF THE DRAWINGS

To describe the solutions in the disclosure more clearly, the following briefly introduces the accompanying drawings required for describing the embodiments. Apparently, the accompanying drawings in the following description show merely some embodiments of the disclosure, and those of ordinary skill in the art may still derive other accompanying drawings from these accompanying drawings without creative efforts.

DETAILED DESCRIPTION

For the sake of convenience, the terms related to embodiments of the disclosure are explained first.

Terms "a plurality of" and "multiple" mean that the number is two or more.

Terms "connect" may be understood in a broad sense. For example, A and B are connected, which can be directly connected or indirectly connected through an intermediate medium.

Hereinafter, specific embodiments of the disclosure will be clearly described in conjunction with the accompanying drawings.

Dimmable glass can switch between transparent and opaque states through various methods such as electric control, temperature control, light control, and pressure control. Almost all mass-produced dimmable glass on the market is electrically controlled dimmable glass. By controlling partitions of the dimmable glass, different patterns can be displayed. The current partitioned dimmable glass is prone to uneven patterned-glass dimming due to unreasonable pattern settings. Specifically, if a channel width of one of partitions is insufficient, the single-channel dimming of an independent partition will have a voltage drop, causing uneven dimming.

In view of above, the embodiments of the disclosure provide a patterned glass and a vehicle, which are capable of optimizing the display uniformity of patterns of a partitioned dimmable patterned glass and enhancing the user experience.

Figure 1:
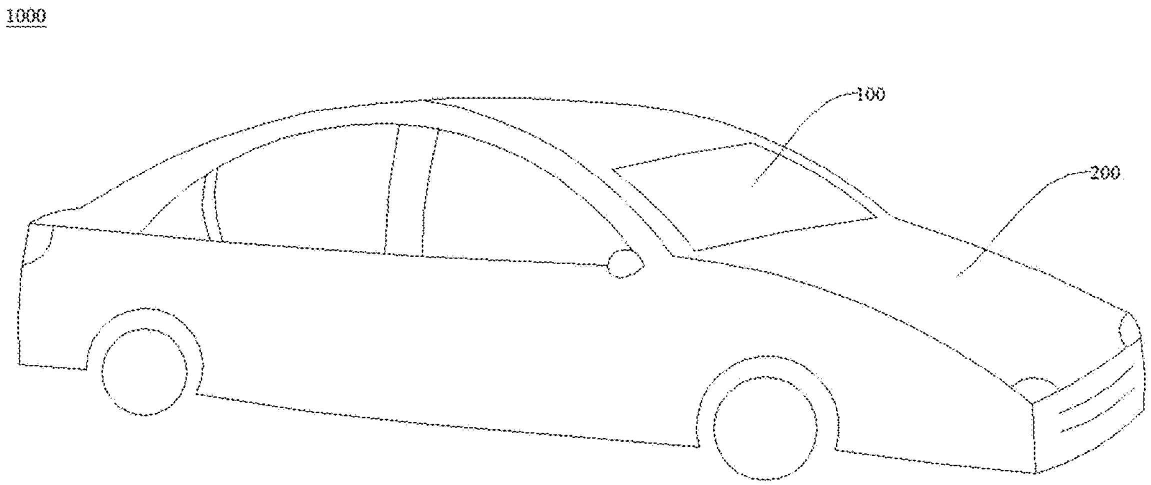
FIG. 1 is a vehicle provided in embodiments of the disclosure.

Referring to FIG. 1, FIG. 1 illustrates a vehicle 1000 provided in the embodiments of the disclosure. The vehicle 1000 includes a patterned glass 100 and a vehicle body 200, and the patterned glass 100 is connected to the vehicle body 200. Exemplarily, the patterned glass 100 may be a sunroof glass, a front windshield glass, a rear windshield glass, or side window glass of the vehicle 1000. The specific position of the patterned glass 100 connected to the vehicle body 200 is not limited in the embodiments of the disclosure.

It may be understood that the embodiments of the disclosure illustrate the vehicle 1000 with the patterned glass 100, but the patterned glass 100 can also be applied to buildings or other uses, and the embodiments of the disclosure do not limit the use of the patterned glass 100.

Figure 2:
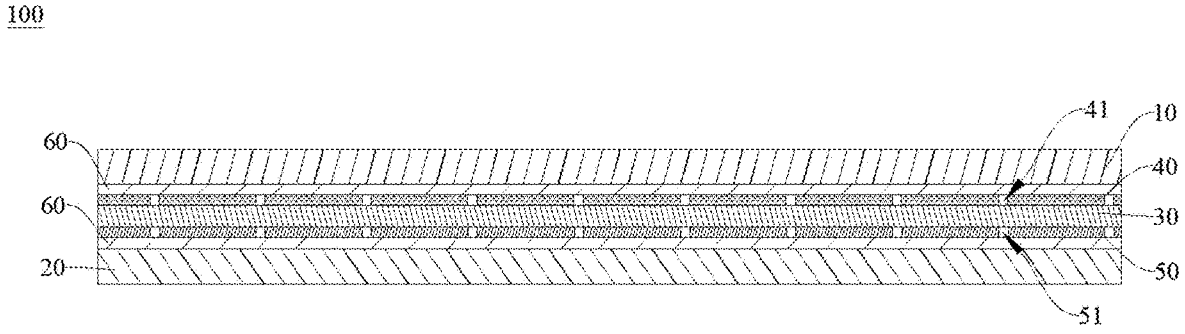
FIG. 2 is a cross-sectional schematic view of a patterned glass provided in embodiments of the disclosure.

Referring to FIG. 2, which is a schematic cross-sectional view of the patterned glass 100 provided in the embodiments of the disclosure. The patterned glass 100 includes an outer glass 10, an inner glass 20, and a light control functional layer 30, a first conducting layer 40, a second conducting layer 50, and two adhesive layers 60. The light control functional layer 30, the first conducting layer 40, the second conducting layer 50, and the two adhesive layers 60 are arranged between the outer glass 10 and the inner glass 20.

It may be noted that the purpose of FIG. 2 is only to schematically describe the connection relationship between the outer glass 10, the inner glass 20, the light control functional layer 30, the first conducting layer 40, the second conducting layer 50, and the two adhesive layers 60, and not to limit the specific connection position, specific structure, and quantity of each device. The schematic structure in the embodiments of the disclosure does not constitute a specific limitation on the patterned glass 100. In other embodiments of the disclosure, the patterned glass 100 may include more or fewer components than shown, or combine some components, or split some components, or have different component arrangements. The illustrated components can be implemented as hardware, software, or a combination of software and hardware.

Exemplarily, the light control functional layer 30 can be one of a polymer dispersed liquid crystal film (PDLC), a suspended particle device (SPD) film, or an electrochromism (EC) film.

The first conducting layer 40 has multiple first separation lines 41, and the second conducting layer 50 has multiple second separation lines 51. The first separation lines 41 can divide the first conducting layer 40 into multiple sections, and the multiple sections of the first conducting layer 40 are electrically insulated from each other. The second separation lines 51 can divide the second conducting layer 50 into multiple sections, and the multiple sections of the second conducting layer 50 are electrically insulated from each other. Each section is independently connected to a voltage source so that they can be separately controlled. Therefore, different areas of the patterned glass 100 can be independently controlled, thereby displaying patterns of the patterned glass 100. The first conducting layer 40, the light control functional layer 30, and the second conducting layer 50 may cooperate to form a dimmable layer (not illustrated). The sections of the first conducting layer 40 and the sections of the second conducting layer 50 cooperate to conduct part of regions of the light control functional layer 30 to form a pattern. That is, the light control functional layer 30 is divided into multiple partitions according to shapes of the sections of the first conducting layer 40 and shapes of the sections of the second conducting layer 50. The shapes of the sections of the first conducting layer 40 may the same as the shapes of the sections of the second conducting layer 50.

The dimmable layer may also include a first dielectric layer (not illustrated) and a second dielectric layer (not illustrated). The first dielectric layer may be disposed between the first conducting layer 40 and the adhesive layer 60 close to the outer glass 10. The second dielectric layer may be disposed between the second conducting layer 50 and the adhesive layer 60 close to the inner glass 20. Both the first dielectric layer and the second dielectric layer can be made of polyethylene terephthalate (PET). The first dielectric layer and the second dielectric layer can prevent internal components (i.e., the first conducting layer 40, the light control functional layer 30, and the second conducting layer 50) from directly contacting external structures, thereby protecting the internal components.

In one possible embodiment, the first conducting layer 40 is disposed between the light control functional layer 30 and the inner glass 20, and the second conducting layer 50 is disposed between the light control functional layer 30 and the outer glass 10. One adhesive layer 60 is disposed between the second conducting layer 50 and the outer glass 10, and another adhesive layer 60 is disposed between the first conducting layer 40 and the inner glass 20. That is, the inner glass 20, the one adhesive layer 60, the first conducting layer 40, the light control functional layer 30, the second conducting layer 50, the another adhesive layer 60, and the outer glass 10 are sequentially stacked. The outer glass 10 is a single layer of glass, of the patterned glass 100, facing the outside of the vehicle, and the inner glass 20 is a single layer of glass, of the patterned glass 100, facing the inside of the vehicle. A current may flow between the first conducting layer 40 and the second conducting layer 50, and the current may flow into the light control functional layer 30 through a current channel. Due to the photoelectric effect of the light control functional layer 30, the transparency of the patterned glass 100 can be changed. It may be noted that the first separation lines 41 and the second separation lines 51 can be straight lines and perpendicular to the light control functional layer 30. The first separation lines 41 and the second separation lines 51 can also be slightly curved. The disclosure does not limit the structure of the first separation lines 41 and the second separation lines 51.

In another possible embodiment, the positions of the first conducting layer 40 and the second conducting layer 50 in this embodiment are changed and thus different from that in the previous embodiments. The first conducting layer 40 is disposed between the light control functional layer 30 and the outer glass 10, and the second conducting layer 50 is disposed between the light control functional layer 30 and the inner glass 20. One adhesive layer 60 is disposed between the first conducting layer 40 and the outer glass 10, and another adhesive layer 60 is disposed between the second conducting layer 50 and the inner glass 20. That is, the outer glass 10, the one adhesive layer 60, the first conducting layer 40, the light control functional layer 30, the second conducting layer 50, the another adhesive layer 60, and the inner glass 20 are sequentially stacked.

Figure 3:
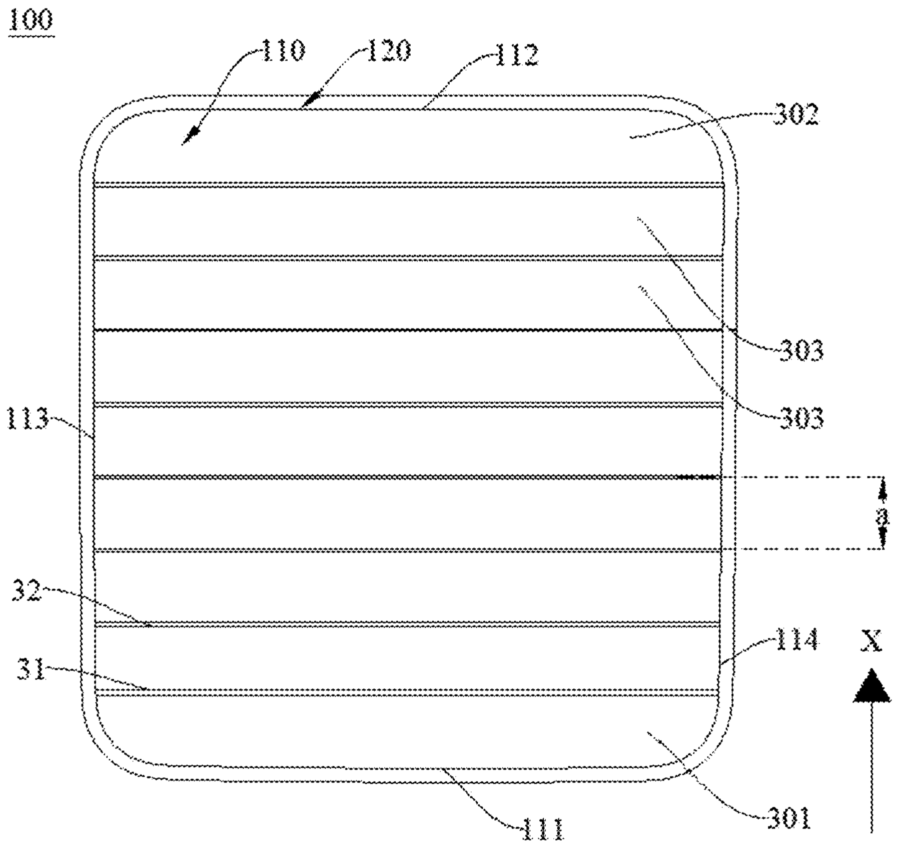
FIG. 3 is a schematic structural view of the patterned glass in FIG. 2, with a light control functional layer partitioned in a manner.

Referring to FIG. 3, which is a schematic structural view of the patterned glass 100 in FIG. 2, with the light control functional layer 30 partitioned in a manner. The patterned glass 100 may have a display region 110 and a non-display region 120. The display region 110 may be at the middle of the patterned glass 100, and the non-display region 120 may be at the edge of the patterned glass 100. The non-display region 120 is arranged around the periphery of the display region 110. The display region 110 is a region of the patterned glass 100 that can display patterns, while the non-display region 120 is a region of the patterned glass 100 that does not display patterns. Alternatively, the display region 110 may be a region on one side of the patterned glass 100, and the non-display region 120 may be a region on another side of the patterned glass 100. The entire patterned glass 100 may be set as the display region 110. The disclosure does not limit the positional relationship between the display region 110 and the non-display region 120.

The display region 110 has a first edge 111, a second edge 112, a third edge 113, and a fourth edge 114. The first edge 111 is opposite to the second edge 112, the third edge 113 is opposite to the fourth edge 114, and the third edge 113 and the fourth edge 114 are arranged between the first edge 111 and the second edge 112. It may be noted that the layer structure of the patterned glass 100 in the display region 110 includes the light control functional layer 30. The layer structure of the patterned glass 100 in the non-display region 120 may not include the light control functional layer 30. Alternatively, the layer structure of the patterned glass 100 in the non-display region 120 may also include the light control functional layer 30, and the patterned glass 100 does not display patterns in the non-display region 120.

The light control functional layer 30 has multiple partitions distributed in a first direction at intervals, where a direction from the first edge 111 towards the second edge 112 serves as the first direction, identified as X. Each partition has a first side 31 and a second side 32 opposite the first side 31, and the first side 31 and the second side 32 are arranged sequentially in the first direction. A distance between the first side 31 and the second side 32 at various positions in the same partition may be varied or unvaried. In a case where the distance between the first side 31 and the second side 32 at various positions in the same partition is varied, the minimum length of a spacing between the first side 31 and the second side 32 serves as distance a between the first side 31 and the second side 32, and the distance a is greater than or equal to 20 mm.

In a possible embodiment, each of the multiple partitions has multiple corners, where a radius of curvature of each of the multiple corners is greater than or equal to 1 mm.

Figure 4:
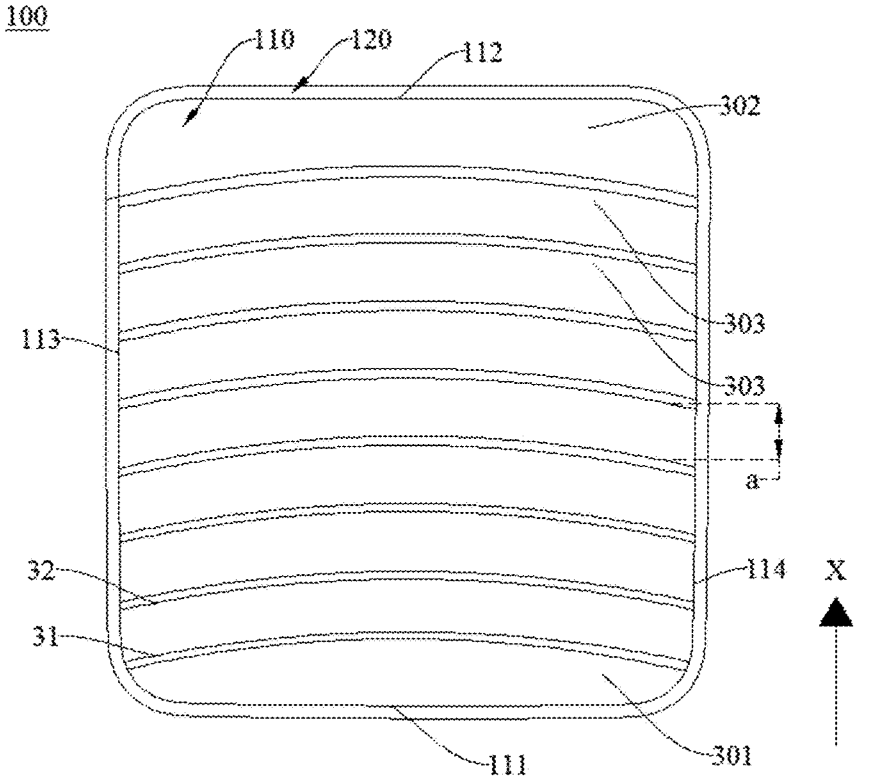
FIG. 4 is a schematic structural view of the patterned glass in FIG. 2, with a light control functional layer partitioned in another manner.
Figure 5:
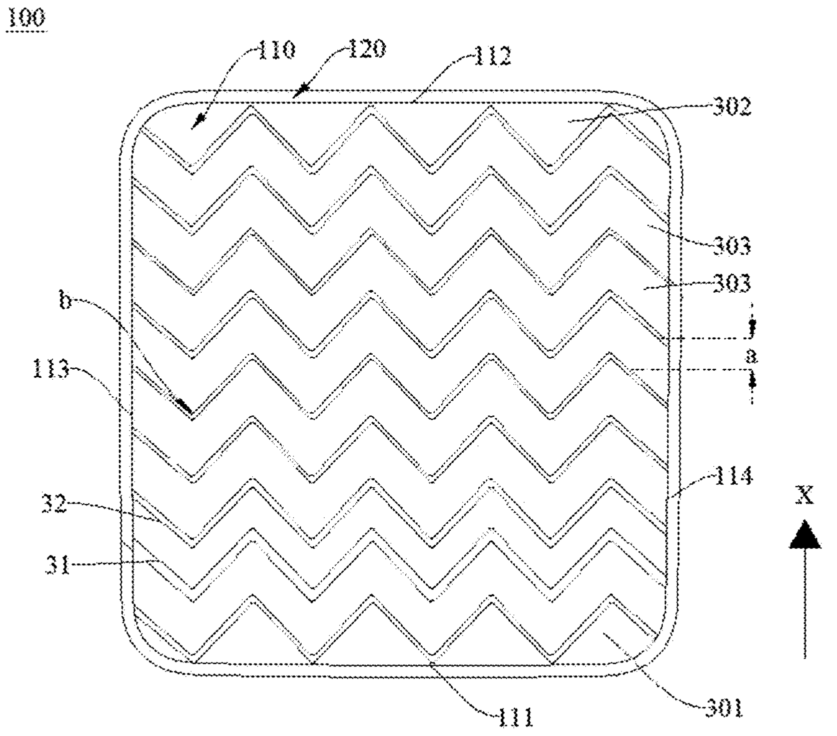
FIG. 5 is a schematic structural view of the patterned glass in FIG. 2, with a light control functional layer partitioned in another manner.
Figure 6:
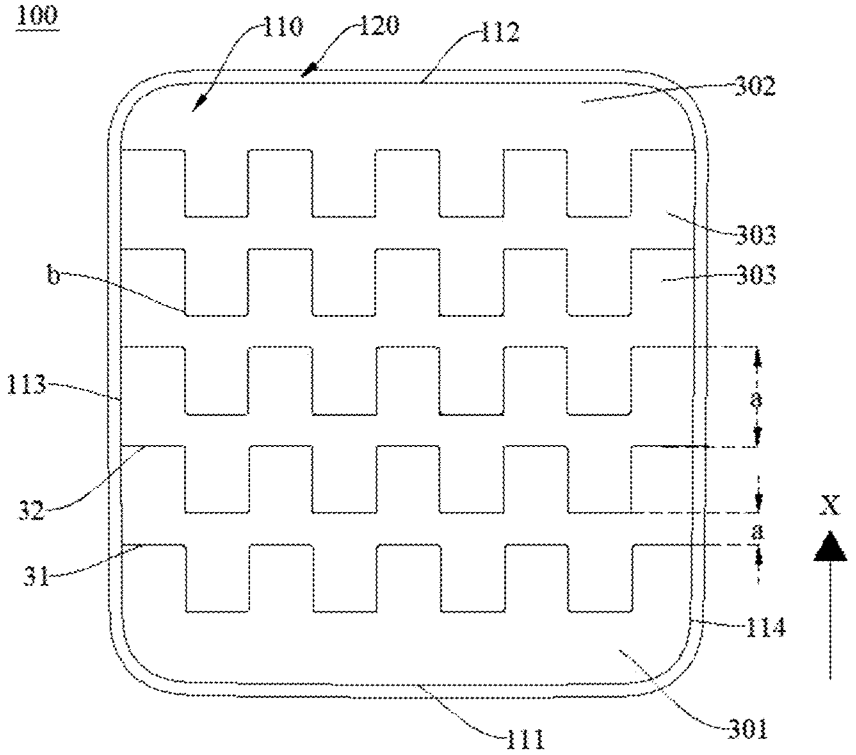
FIG. 6 is a schematic structural view of the patterned glass in FIG. 2, with a light control functional layer partitioned in another manner.

In an embodiment, refer to FIGS. 3, 4, 5, and 6. FIG. 3 is a schematic structural view of the patterned glass 100 provided in the embodiments of the disclosure, with the light control functional layer 30 partitioned in a manner, FIG. 4 is a schematic structural view of the patterned glass 100 provided in the embodiments of the disclosure, with the light control functional layer 30 partitioned in another manner, FIG. 5 is a schematic structural view of the patterned glass 100 provided in the embodiments of the disclosure, with the light control functional layer 30 partitioned in another manner, and FIG. 6 is a schematic structural view of the patterned glass 100 provided in the embodiments of the disclosure, with the light control functional layer partitioned in another manner. One of the multiple partitions located at one end of the light control functional layer 30 serves as a first partition 301, one of the multiple partitions located at another end of the light control functional layer 30 serves as a second partition 302, and regions located between the two ends of the light control functional layer 30 among the multiple partitions serve as multiple third partitions 303. One first partition 301, the multiple third partitions 303, and one second partition 302 are arranged sequentially in the first direction. The multiple third partitions 303 are the same in shape. The first side 31 and the second side 32 of the third partition 303 are arranged in parallel.

As illustrated in FIG. 3, in an embodiment, both the first side 31 and the second side 32 of the third partition 303 are straight lines. Both the first side 31 and the second side 32 extend from the third edge 113 of the display region 110 to the fourth edge 114 of the display region 110. Distance a between the first side 31 and the second side 32 is greater than or equal to 20 mm.

As illustrated in FIG. 4, in an embodiment, both the first side 31 and the second side 32 of the third partition 303 are arc-shaped. Both the first side 31 and the second side 32 extend from the third edge 113 of the display region to the fourth edge 114 of the display region. Distance a between the first side 31 and the second side 32 is greater than or equal to 20 mm.

As illustrated in FIG. 5, in an embodiment, both the first side 31 and the second side 32 of the third partition 303 are zigzag-shaped. In each of the first side 31 and the second side 32, each two adjacent line segments are connected to each other by arc b with a radius of curvature greater than or equal to 1 mm. Distance a between the first side 31 and the second side 32 is greater than or equal to 20 mm. Both the first side 31 and the second side 32 extend from the third edge 113 of the display region to the fourth edge 114 of the display region.

As illustrated in FIG. 6, in an embodiment, both the first side 31 and the second side 32 are rectangular wave-shaped, and distance a between the first side 31 and the second side 32 is greater than or equal to 20 mm. In each of the first side 31 and the second side 32, each two adjacent line segments are connected to each other by arc b with a radius of curvature greater than or equal to 1 mm. Both the first side 31 and the second side 32 extend from the third edge 113 of the display region to the fourth edge 114 of the display region.

Figure 7:
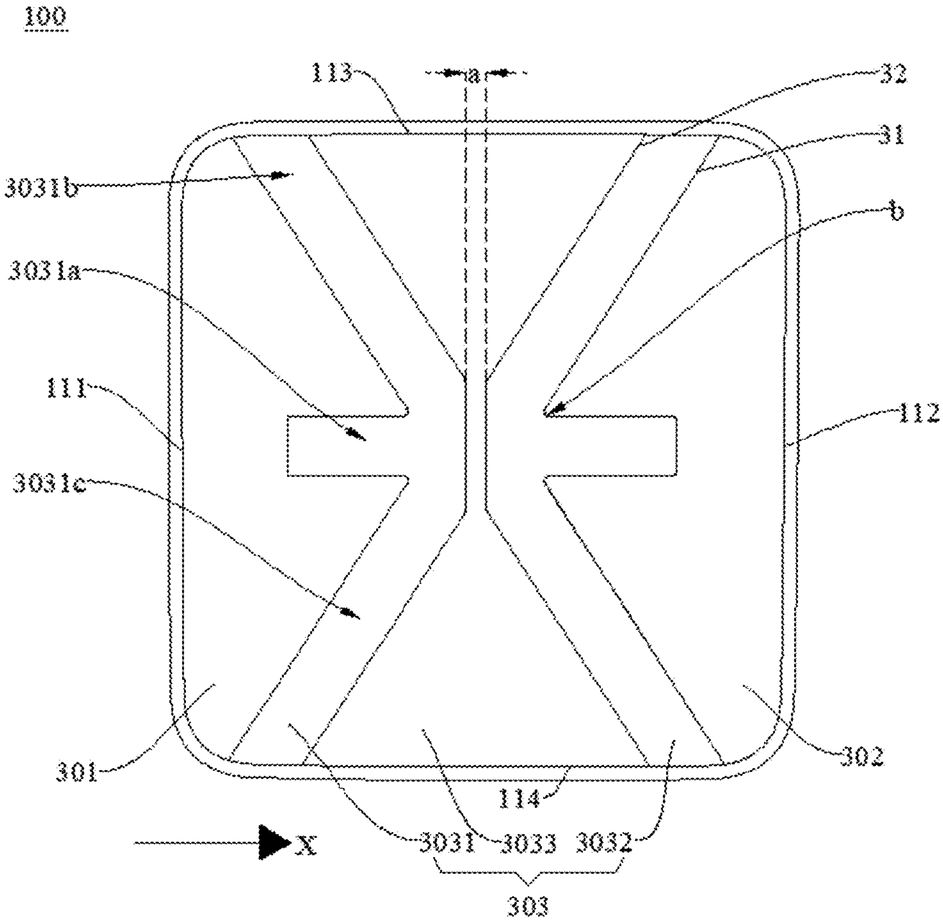
FIG. 7 is a schematic structural view of the patterned glass in FIG. 2, with a light control functional layer partitioned in another manner.

In an embodiment, refer to FIG. 7, which is a schematic structural view of the patterned glass 100 provided in the embodiments of the disclosure, with the light control functional layer 30 partitioned in another manner.

One of the multiple partitions located at the first edge 111 serves as the first partition 301, one of the multiple partitions located at the second edge 112 serves as the second partition 302, and regions located between the first edge 111 and the second edge 112 among the multiple partitions serve as one third partition 303. One first partition 301, the one third partition 303, and one second partition 302 are arranged sequentially in the first direction.

The third partition in FIG. 7 is implemented as one third partition. The third partition 303 has three regions, that is, a first sub-partition 3031, a second sub-partition 3032, and a third sub-partition 3033. The first sub-partition 3031 and the second sub-partition 3032 are symmetrically arranged on both sides of the third sub-partition 3033.

The first sub-partition 3031 has a first branch **3031*a*, a second branch 3031*b*, and a third branch 3031*c*. The first branch 3031*a* extends in the first direction, the second branch 3031*b* and the third branch 3031*c* are symmetrically arranged on both sides of the first branch 3031*a*, both one end of the second branch 3031*b* and one end of the third branch 3031*c* are connected to one end of the first branch 3031*a*. Another end of the second branch 3031*b* extends to the third edge 113, and another end of the third branch 3031*c* extends to the fourth edge 114. The first branch 3031*a* may be connected to the second branch 3031*b* by an arc with a radius of curvature greater than or equal to 1 mm. The first branch 3031*a* may be connected to the third branch 3031*c*** by an arc with a radius of curvature greater than or equal to 1 mm.

Since the second sub-partition 3032 is symmetrical to the first sub-partition 3031 about the third sub-partition 3033, the shape of the second sub-partition 3032 is a mirror image of the shape of the first sub-partition 3031. Therefore, the shape of the second sub-partition 3032 can refer to the shape of the first sub-partition 3031, and will not be described herein in detail.

Figure 8:
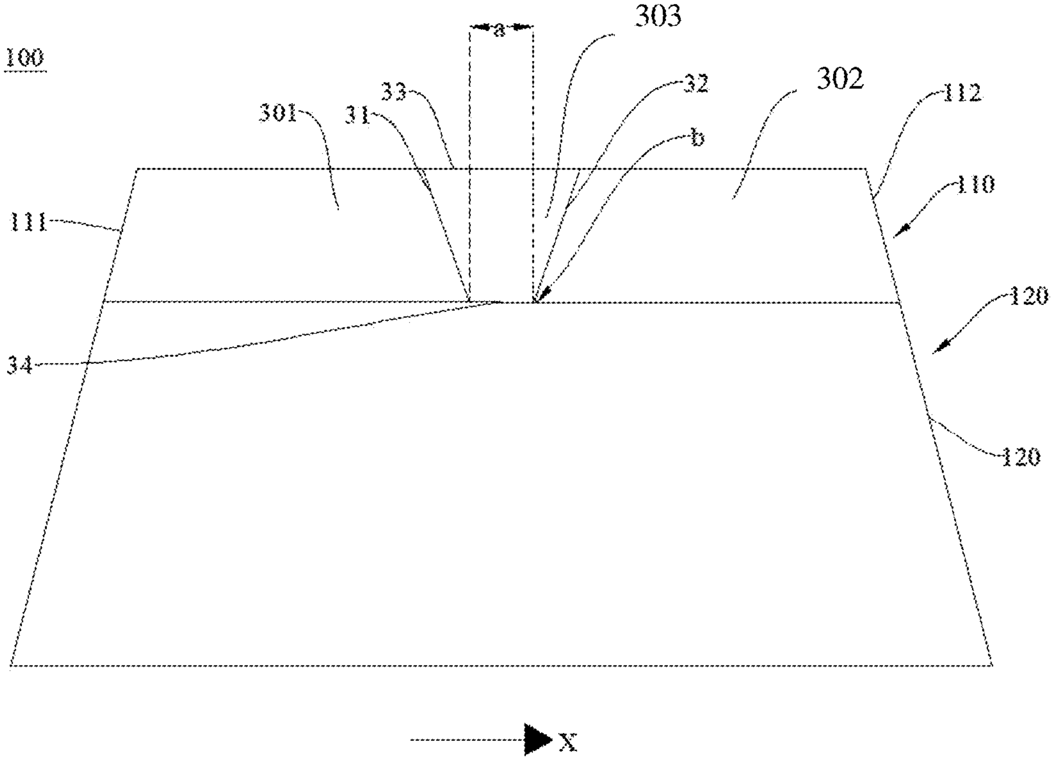
FIG. 8 is a schematic structural view of the patterned glass in FIG. 2, with a light control functional layer partitioned in another manner.

In an embodiment, refer to FIG. 8, which is a schematic structural view of the patterned glass 100 provided in the embodiments of the disclosure, with the light control functional layer 30 partitioned in another manner.

It may be understood that both the patterned glass 100 in FIG. 3 and the patterned glass 100 in FIG. 7 may be a sunroof glass. The patterned glass 100 in FIG. 8 may be a front windshield glass. The display region 110 of the patterned glass 100 may be located in the upper half of the front windshield glass of the vehicle 1000. The first edge 111 and the second edge 112 of the patterned glass 100 are located on the left and right sides of the front windshield glass, respectively. Similar to the patterned glass 100 in FIG. 7, the light control functional layer 30 of the patterned glass 100 in FIG. 8 includes one first partition 301, one third partition 303, and one second partition 302, and the one first partition 301, the one third partition 303, and the one second partition 302 are arranged sequentially in the first direction.

The patterned glass 100 in FIG. 8 is different from the patterned glass 100 in FIG. 7 as follows. In the patterned glass 100 in FIG. 8, each of the first partition 301, the second partition 302, and the third partition 303 is trapezoidal and has the first side 31, the second side 32, the third side 33, and the fourth side 34. The first side 31 is opposite to the second side 32, the third side 33 is opposite to the fourth side 34, and both the third side 33 and the fourth side 34 are connected to the first side 31 and the second side 32. Both distance a between the first side 31 and the second side 32 and distance a between the third side 33 and the fourth side 34 are greater than or equal to 20 mm. The third partition 303 may be an inverted trapezoid. In the patterned glass 100 in FIG. 8, the first partition 301 and the second partition 302 are symmetrically arranged on both sides of the third partition 303. The third partition 303 can improve transparency under the action of electric current, making it easier for devices such as cameras or dashcams inside the vehicle to capture images outside the vehicle.

Figure 9:
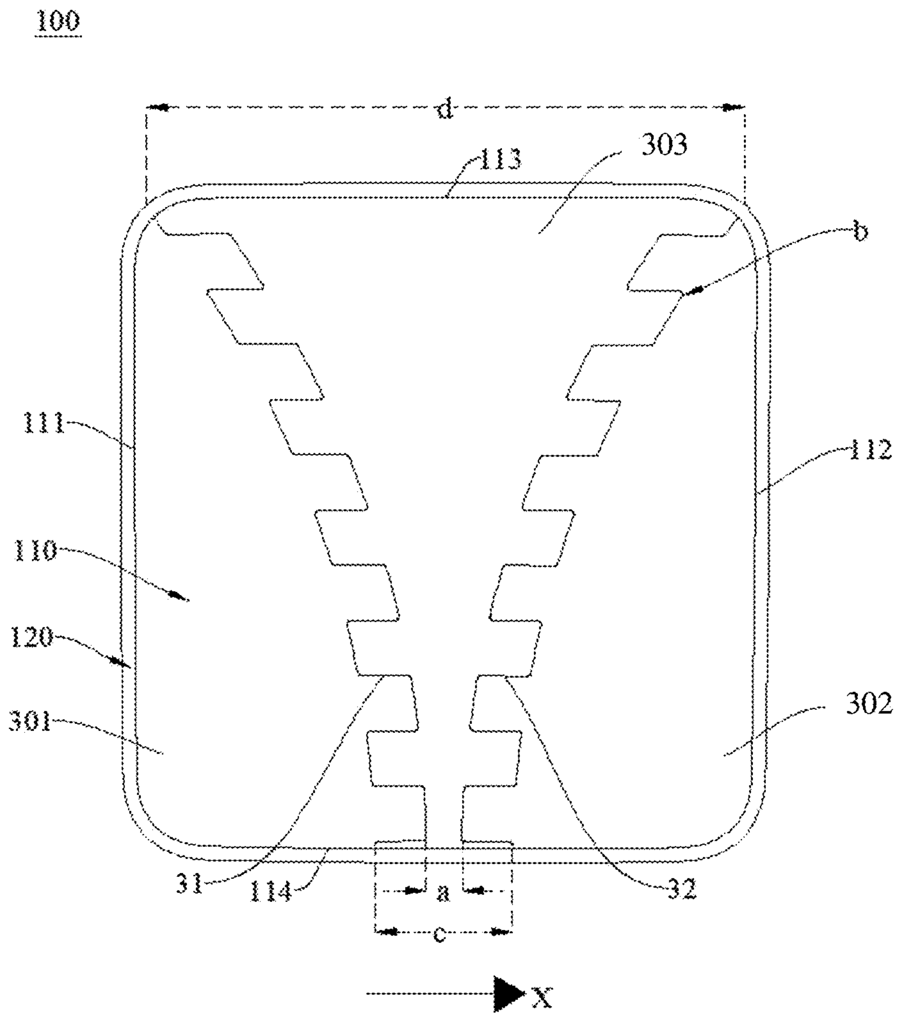
FIG. 9 is a schematic structural view of the patterned glass in FIG. 2, with a light control functional layer partitioned in another manner.

In an embodiment, refer to FIG. 9, which is a schematic structural view of the patterned glass 100 provided in the embodiments of the disclosure, with the light control functional layer 30 partitioned in another manner. Similar to the patterned glass 100 in FIG. 7, the light control functional layer 30 of the patterned glass 100 in FIG. 9 includes one first partition 301, one third partition 303, and one second partition 302, and the one first partition 301, the one third partition 303, and the one second partition 302 are arranged sequentially in the first direction.

The first partition 301 and the second partition 302 are symmetrically arranged on both sides of the third partition 303. The patterned glass 100 in FIG. 9 is different from the patterned glass 100 in FIG. 7 as follows. In the patterned glass 100 in FIG. 9, both the first side 31 and the second side 32 of the third partition 303 are wavy, composed of multiple bent line segments. Both the first side 31 and the second side 32 of the third partition 303 extend from one end of the display region 110 close to the third edge 113 to another end of the display region 110 close to the fourth edge 114. A distance between one end of the first side 31 close to the third edge 113 and one end of the second side 32 close to the third edge 113 is first distance d, and a distance between another end of the first side 31 close to the fourth edge 114 and another end of the second side 32 close to the fourth edge 114 is second distance c, where first distance dis greater than second distance c, and distance a between the first side 31 and the second side 32 is greater than or equal to 20 mm. In each of the first side 31 and the second side 32, each two adjacent segments are connected to each other by arc b with a radius of curvature greater than or equal to 1 mm.

Figure 10:
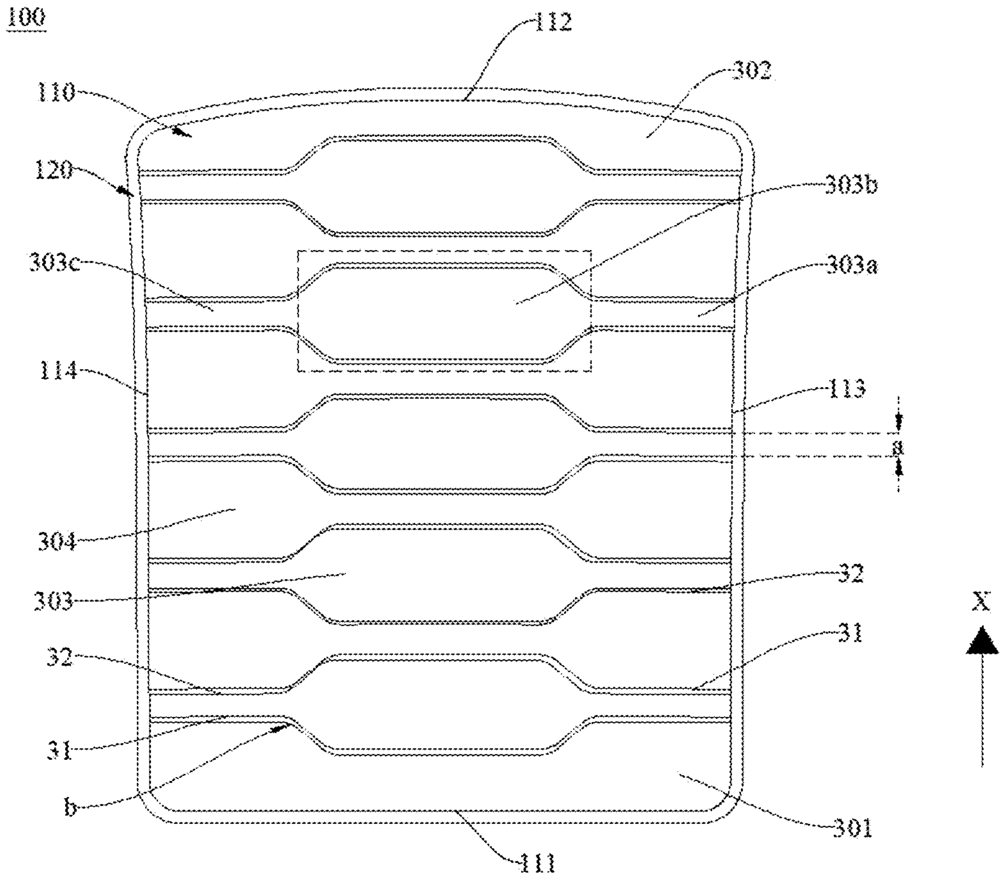
FIG. 10 is a schematic structural view of the patterned glass in FIG. 2, with a light control functional layer partitioned in another manner.

In an embodiment, refer to FIG. 10, which is a schematic structural view of the patterned glass 100 provided in the embodiments of the disclosure, with the light control functional layer 30 partitioned in another manner. The patterned glass 100 in FIG. 10 is different from the patterned glass 100 in FIG. 3 as follows. The light control functional layer 30 of the patterned glass 100 in FIG. 10 has four partitions. Specifically, one of the multiple partitions located at the first edge 111 serves as the first partition 301, one of the multiple partitions located at the second edge 112 serves as the second partition 302, and regions located between the first edge 111 and the second edge 112 among the multiple partitions serve as multiple third partitions 303 and multiple fourth partitions 304. Each two adjacent third partitions 303 among the multiple third partitions 303 are spaced apart from each other by one fourth partition 304 and are symmetrically arranged on both sides of the one fourth partition 304.

The third partition 303 has a first section 303*a*, a second section 303*b*, and a third section 303*c* arranged in sequence in a direction perpendicular to the first direction. The second section 303*b* is longer than both the first section 303*a* and the third section 303*c* in the first direction. The second section 303*b* may be octagonal. The first section 303*a* and the third section 303*c* are the same as each other in shape and are rectangular. The first section 303*a* and the third section 303*c* are located on the two opposite sides of the second section 303*b*, respectively. The fourth partition 304 may be hourglass-shaped and located between the two third partitions 303. An edge of the fourth partition 304 may be spaced apart from an edge of the third partitions 303.

Each two adjacent segments of the second section 303*b* are connected to each other by an arc with a radius of curvature greater than or equal to 1 mm. The first section 303*a* is smoothly connected to the second section 303*b* by an arc with a radius of curvature greater than or equal to 1 mm. The third section 303*c* is smoothly connected to the second section 303*b* by an arc with a radius of curvature greater than or equal to 1 mm.

In the patterned glass 100 in FIG. 10, there are five third partitions 303 and four fourth partitions 304. Thus, in the patterned glass 100 in FIG. 10, the partitions of the patterned glass 100 are sequentially arranged in the first direction as follows. One first partition 301, one third partition 303, one fourth partition 304, one third partition 303, one fourth partition 304, one third partition 303, one fourth partition 304, one third partition 303, one fourth partition 304, one third partition 303, and one second partition 302 are sequentially arranged. Each partition has the first side 31 and the second side 32 opposite the first side 31, and distance a between the first side 31 and the second side 32 is greater than or equal to 20 mm.

Figure 11:
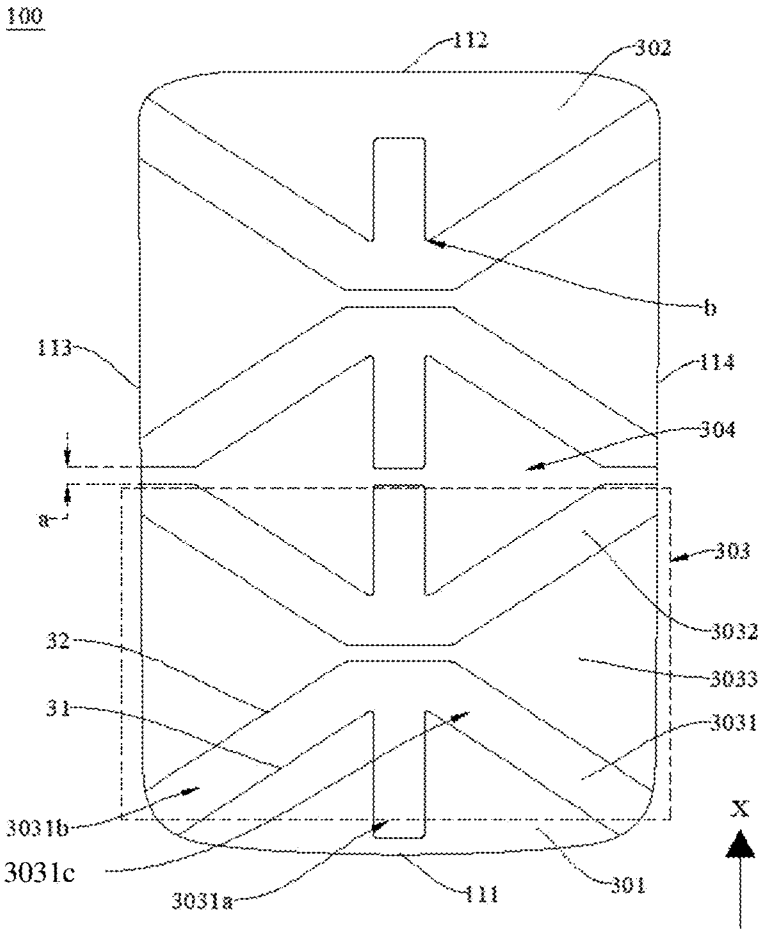
FIG. 11 is a schematic structural view of the patterned glass in FIG. 2, with a light control functional layer partitioned in another manner.

In an embodiment, refer to FIG. 11, which is a schematic structural view of the patterned glass 100 provided in the embodiments of the disclosure, with the light control functional layer 30 partitioned in another manner. Similar to the patterned glass 100 in FIG. 10, the light control functional layer 30 of the patterned glass 100 in FIG. 11 also includes one first partition 301, one second partition 302, multiple third partitions 303, and multiple fourth partitions 304, and the position of each partition of the patterned glass 100 in FIG. 11 may be the same as the position of each partition in FIG. 10. The patterned glass 100 in FIG. 11 is different from the patterned glass 100 in FIG. 10 as follows. In the patterned glass 100 in FIG. 11, the third partition 303 has a first sub-partition 3031, a second sub-partition 3032, and a third sub-partition 3033, where the first sub-partition 3031 and the second sub-partition 3032 are symmetrically arranged on both sides of the third sub-partition 3033.

The first sub-partition 3031 has the first branch 3031*a*, the second branch 3031*b*, and the third branch 3031*c*. The first branch 3031*a* extends in the first direction. The second branch 3031*b* and the third branch 3031*c* are symmetrically arranged on both sides of the first branch 3031*a*. Both one end of the second branch 3031*b* and one end of the third branch 3031*c* are connected to one end of the first branch 3031*a*. Another end of the second branch 3031*b* extends to the third edge 113, and another end of the third branch 3031*c* extends to the fourth edge 114. The first branch 3031*a* is connected to the second branch 3031*b* by an arc with a radius of curvature greater than or equal to 1 mm. The first branch 3031*a* is connected to the third branch 3031*c* by an arc with a radius of curvature greater than or equal to 1 mm.

Since the second sub-partition 3032 is symmetrical to the first sub-partition 3031 about the third sub-partition 3033, the shape of the second sub-partition 3032 is a mirror image of the shape of the first sub-partition 3031. Therefore, the shape of the second sub-partition 3032 can refer to the shape of the first sub-partition 3031, and will not be described herein in detail. For example, there may be three third partitions 303, where one fourth partition 304 is disposed between each two adjacent third partitions 303. Alternatively, there may be four third partitions 303, where one fourth partition 304 is disposed between each two adjacent third partitions 303. In this embodiment, there may be multiple third partitions 303, and the number of third partitions 303 is not limited in this embodiment.

Figure 12:
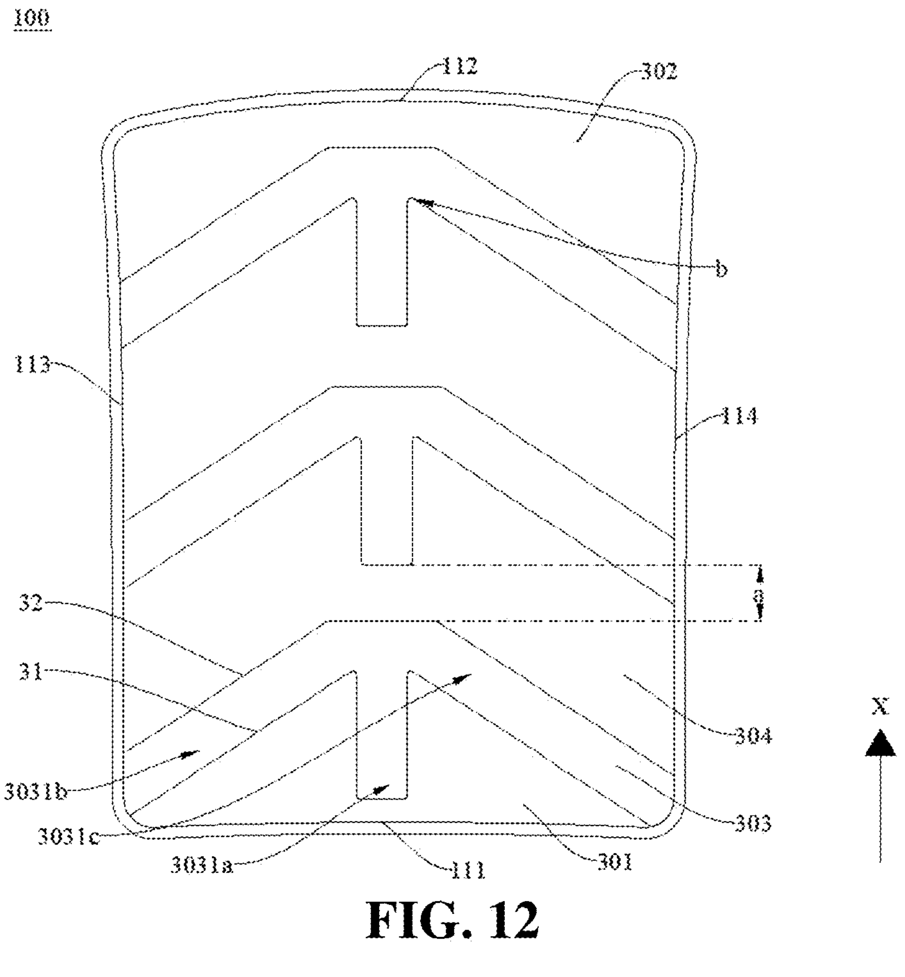
FIG. 12 is a schematic structural view of the patterned glass in FIG. 2, with a light control functional layer partitioned in another manner.

In an embodiment, refer to FIG. 12, which is a schematic structural view of the patterned glass 100 provided in the embodiments of the disclosure, with the light control functional layer 30 partitioned in another manner.

Similar to the patterned glass 100 in FIG. 10, the patterned glass 100 in FIG. 12 also includes one first partition 301, one second partition 302, multiple third partitions 303, and multiple fourth partitions 304, and the position of each partition of the patterned glass 100 in FIG. 12 may be the same as the position of each partition of the patterned glass 100 in FIG. 10.

The light control functional layer 30 of the patterned glass 100 in FIG. 12 is different from the patterned glass 100 in FIG. 10 as follows. In the patterned glass 100 in FIG. 12, the third partition 303 has the first branch 3031*a*, the second branch 3031*b*, and the third branch 3031*c*. The first branch 3031*a* extends in the first direction, and the second branch 3031*b* and the third branch 3031*c* are symmetrically arranged on both sides of the first branch 3031*a*. Both one end of the second branch 3031_b_ and one end of the third branch 3031_c_ are connected to one end of the first branch 3031_a_. Another end of the second branch 3031_b_ extends to the third edge 113, and another end of the third branch 3031_c_ extends to the fourth edge 114. The first branch 3031_a_ is connected to the second branch 3031_b_ by an arc with a radius of curvature greater than or equal to 1 mm. The first branch 3031_a_ is connected to the third branch 3031_c_ by an arc with a radius of curvature greater than or equal to 1 mm.

The embodiments of the disclosure are described in detail above, specific examples are used herein to describe the principle and implementation manners of the disclosure. The description of the above embodiments is merely used to help understand the method and the core idea of the disclosure. Meanwhile, those skilled in the art may make modifications to the specific implementation manners and the application scope according to the idea of the disclosure. In summary, the contents of the specification should not be construed as limiting the disclosure.

What is claimed is:

1. A patterned glass, wherein the patterned glass comprises a display region having a first edge and a second edge opposite the first edge, wherein a direction from the first edge towards the second edge serves as a first direction; and wherein the patterned glass further comprises an outer glass, an inner glass, and a light control functional layer disposed between the outer glass and the inner glass, wherein the light control functional layer has a plurality of partitions distributed in the first direction at intervals, wherein each of the plurality of partitions has a first side and a second side opposite the first side, the first side and the second side are sequentially distributed in the first direction, and a distance between the first side and the second side is greater than or equal to 20 mm.

2. The patterned glass according to claim 1, wherein each of the plurality of partitions has a plurality of corners, wherein a radius of curvature of each of the plurality of corners is greater than or equal to 1 mm.

3. The patterned glass according to claim 1, wherein the first side is a straight line or a curve.

4. The patterned glass according to claim 1, wherein one of the plurality of partitions located at the first edge serves as a first partition, one of the plurality of partitions located at the second edge serves as a second partition, and at least one of the plurality of partitions located between the first edge and the second edge serves as at least one third partition, wherein the first partition, the at least one third partition, and the second partition are arranged at intervals in the first direction.

5. The patterned glass according to claim 4, wherein the at least one third partition is implemented as a plurality of third partitions, wherein the plurality of third partitions are arranged at intervals and are the same in shape.

6. The patterned glass according to claim 4, wherein each of the at least one third partition has a first sub-partition, a second sub-partition, and a third sub-partition, wherein the first sub-partition and the second sub-partition are symmetrically arranged on both sides of the third sub-partition.

7. The patterned glass according to claim 1, wherein one of the plurality of partitions located at the first edge serves as a first partition, one of the plurality of partitions located at the second edge serves as a second partition, and regions located between the first edge and the second edge among the plurality of partitions serve as a plurality of third partitions and at least one fourth partition, wherein each adjacent two third partitions among the plurality of third partitions are spaced apart from each other by one fourth partition and are symmetrically arranged on both sides of the one fourth partition.

8. The patterned glass according to claim 7, wherein each of the plurality of third partitions has a first sub-partition, a second sub-partition, and a third sub-partition, wherein the first sub-partition and the second sub-partition are symmetrically arranged on both sides of the third sub-partition.

9. The patterned glass according to claim 6, wherein the display region further has a third edge and a fourth edge opposite the third edge, wherein the third edge and the fourth edge are located between the first edge and the second edge; and the first sub-partition has a first branch, a second branch, and a third branch, wherein the first branch extends in the first direction, the second branch and the third branch are symmetrically arranged on both sides of the first branch, both one end of the second branch and one end of the third branch are connected to one end of the first branch, another end of the second branch extends to the third edge, and another end of the third branch extends to the fourth edge.

10. The patterned glass according to claim 7, wherein the display region further has a third edge and a fourth edge opposite the third edge, wherein the third edge and the fourth edge are located between the first edge and the second edge; and each of the plurality of third partitions has a first branch, a second branch, and a third branch, wherein the first branch extends in the first direction, the second branch and the third branch are symmetrically arranged on both sides of the first branch, both one end of the second branch and one end of the third branch are connected to one end of the first branch, another end of the second branch extends to the third edge, and another end of the third branch extends to the fourth edge.

11. The patterned glass according to claim 7, wherein each of the plurality of third partitions has a first section, a second section, and a third section arranged in sequence in a direction perpendicular to the first direction, wherein the second section is longer than both the first section and the third section in the first direction.

12. The patterned glass according to claim 1, further comprising a first conducting layer and a second conducting layer, wherein the first conducting layer is disposed between the light control functional layer and the inner glass, and the second conducting layer is disposed between the light control functional layer and the outer glass; or the first conducting layer is disposed between the light control functional layer and the outer glass, and the second conducting layer is disposed between the light control functional layer and the inner glass.

13. The patterned glass according to claim 12, further comprising two adhesive layers, wherein one of the two adhesive layers is disposed between the first conducting layer and the inner glass, and another one of the two adhesive layers is disposed between the second conducting layer and the outer glass; or one of the two adhesive layers is disposed between the second conducting layer and the inner glass, and another one of the two adhesive layers is disposed between the first conducting layer and the outer glass.

14. A vehicle, comprising a vehicle body and a patterned glass connected to the vehicle body, wherein the patterned glass comprises a display region having a first edge and a second edge opposite the first edge, wherein a direction from the first edge towards the second edge serves as a first direction; and wherein the patterned glass further comprises an outer glass, an inner glass, and a light control functional layer disposed between the outer glass and the inner glass, wherein the light control functional layer has a plurality of partitions distributed in the first direction at intervals, wherein each of the plurality of partitions has a first side and a second side opposite the first side, the first side and the second side are sequentially distributed in the first direction, and a distance between the first side and the second side is greater than or equal to 20 mm.

15. The vehicle according to claim 14, wherein each of the plurality of partitions has a plurality of corners, wherein a radius of curvature of each of the plurality of corners is greater than or equal to 1 mm.

16. The vehicle according to claim 14, wherein the first side is a straight line or a curve.

17. The vehicle according to claim 14, wherein one of the plurality of partitions located at the first edge serves as a first partition, one of the plurality of partitions located at the second edge serves as a second partition, and at least one of the plurality of partitions located between the first edge and the second edge serves as at least one third partition, wherein the first partition, the at least one third partition, and the second partition are arranged at intervals in the first direction.

18. The vehicle according to claim 17, wherein the at least one third partition is implemented as a plurality of third partitions, wherein the plurality of third partitions are arranged at intervals and are the same in shape.

19. The vehicle according to claim 17, wherein each of the at least one third partition has a first sub-partition, a second sub-partition, and a third sub-partition, wherein the first sub-partition and the second sub-partition are symmetrically arranged on both sides of the third sub-partition.

20. The vehicle according to claim 14, wherein one of the plurality of partitions located at the first edge serves as a first partition, one of the plurality of partitions located at the second edge serves as a second partition, and regions located between the first edge and the second edge among the plurality of partitions serve as a plurality of third partitions and at least one fourth partition, wherein each adjacent two third partitions among the plurality of third partitions are spaced apart from each other by one fourth partition and are symmetrically arranged on both sides of the one fourth partition.

* * * * *